(12) United States Patent
Shigemitsu et al.

(10) Patent No.: US 10,412,288 B2
(45) Date of Patent: Sep. 10, 2019

(54) CAMERA MODULE INCLUDING IMAGE SENSOR AND CAMERA WINDOW HOLDING MECHANISM

(71) Applicant: Sharp Kabushiki Kaisha, Sakai, Osaka (JP)

(72) Inventors: Norimichi Shigemitsu, Sakai (JP); Yoshihiro Sekimoto, Sakai (JP); Tetsuya Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/310,218

(22) PCT Filed: Mar. 18, 2015

(86) PCT No.: PCT/JP2015/058060
§ 371 (c)(1),
(2) Date: Nov. 10, 2016

(87) PCT Pub. No.: WO2015/174137
PCT Pub. Date: Nov. 19, 2015

(65) Prior Publication Data
US 2017/0150022 A1    May 25, 2017

(30) Foreign Application Priority Data
May 16, 2014    (JP) ................. 2014-102538

(51) Int. Cl.
*H04N 5/225* (2006.01)
*G02B 7/04* (2006.01)
(Continued)

(52) U.S. Cl.
CPC .............. *H04N 5/2257* (2013.01); *G02B 7/04* (2013.01); *G02B 7/08* (2013.01); *G03B 17/02* (2013.01);
(Continued)

(58) Field of Classification Search
CPC . G02B 7/04; G02B 7/08; G03B 17/02; H04N 5/2252; H04N 5/2253; H04N 5/2254; H04N 5/2257; H04N 5/232
See application file for complete search history.

(56) References Cited

U.S. PATENT DOCUMENTS 7,450,834 B2 * 11/2008 Makii .................... G02B 7/026
                                                            367/165
7,817,358 B2 * 10/2010 Ke ............................ G02B 7/08
                                                            359/694

(Continued)

FOREIGN PATENT DOCUMENTS

EP         1 560 054 A1    8/2005
JP      2005-242319 A      9/2005
(Continued)

OTHER PUBLICATIONS

Official Communication issued in International Patent Application No. PCT/JP2015/058060, dated Jun. 16, 2015.

*Primary Examiner* — Amy R Hsu
(74) *Attorney, Agent, or Firm* — Keating & Bennett, LLP

(57) ABSTRACT

A camera window holding mechanism (2) for holding a terminal camera window (3) is provided in a shoulder portion of a camera module (10a), an opening (H) is formed in a center portion of the camera window holding mechanism (2), and some of lenses on an object side of a lens unit (4a) are accommodated in the opening (H).

7 Claims, 6 Drawing Sheets

(51) Int. Cl.
  *G03B 17/02*   (2006.01)
  *G02B 7/08*    (2006.01)
  *G03B 17/12*   (2006.01)

(52) U.S. Cl.
  CPC .......... *G03B 17/12* (2013.01); *H04N 5/2252* (2013.01); *H04N 5/2253* (2013.01); *H04N 5/2254* (2013.01)

(56) References Cited

U.S. PATENT DOCUMENTS

| | | | | |
|---|---|---|---|---|
| 8,107,006 | B2 * | 1/2012 | Sekimoto | G03B 9/08 |
| | | | | 348/248 |
| 2007/0086770 | A1 * | 4/2007 | Okita | F16F 1/324 |
| | | | | 396/133 |
| 2008/0278833 | A1 | 11/2008 | Yuan | |
| 2009/0295983 | A1 * | 12/2009 | Sekimoto | H04N 5/2254 |
| | | | | 348/362 |
| 2011/0134305 | A1 | 6/2011 | Sano et al. | |
| 2013/0176469 | A1 | 7/2013 | Sano et al. | |

FOREIGN PATENT DOCUMENTS

| | | | |
|---|---|---|---|
| JP | 2007-271878 | A | 10/2007 |
| JP | 2008-052196 | A | 3/2008 |
| JP | 2009-288327 | A | 12/2009 |
| JP | 2014-029547 | A | 2/2014 |

\* cited by examiner

1: ACTUATOR
2: CAMERA WINDOW HOLDING MECHANISM
3: TERMINAL CAMERA WINDOW
4a: LENS UNIT
5a: LENS BARREL
6: SUBSTRATE
7: SENSOR
8: COVER GLASS HOLDING MECHANISM
9: COVER GLASS
11: MECHANICAL SYSTEM
H: OPENING

1: ACTUATOR
2: CAMERA WINDOW HOLDING MECHANISM
3: TERMINAL CAMERA WINDOW
4b: LENS UNIT
5b: TIP APERTURE LENS BARREL
6: SUBSTRATE
7: SENSOR
8: COVER GLASS HOLDING MECHANISM
9: COVER GLASS
11: MECHANICAL SYSTEM
H: OPENING
K: EDGE PORTION

CAMERA MODULE INCLUDING IMAGE SENSOR AND CAMERA WINDOW HOLDING MECHANISM

TECHNICAL FIELD

The present invention relates to a camera module including an image sensor that converts optical signals received through a lens unit into electrical signals, and a terminal device including the camera module.

BACKGROUND ART

In recent years, the number of pixels of a camera module which is mounted in a terminal device such as a smartphone or a mobile phone has been increasing. While a camera module has a higher resolution and the number of pixels is increased, it is not easy to reduce the cell size of an image sensor because the reception sensitivity is intended to increase.

The overall optical length required to satisfy the desired angle of view and the effective image circle diameter are in general determined to some extent, and as the number of pixels is increased, the height of the module tends to increase. In the related art, in order to reduce the overall optical length, as in the technique described in Patent Document 3, an aperture stop is disposed on the side closest to an object or between a first lens and a second lens in most configurations.

A technique disclosed in PTL 1 is an example of the related art for reducing the overall optical length. In the technique described in PTL 1, a mechanical shutter is provided on the top surface of a lens unit, and a projecting portion formed on the tip of a lens is accommodated in a recessed portion formed at the back surface of the mechanical shutter.

CITATION LIST

Patent Literature

PTL 1: Japanese Unexamined Patent Application Publication No. 2009-288327 (Published on Dec. 10, 2009)

PTL 2: Japanese Unexamined Patent Application Publication No. 2008-52196 (Published on Mar. 6, 2008)

PTL 3: Japanese Unexamined Patent Application Publication No. 2014-29547 (Published on Feb. 13, 2014)

SUMMARY OF INVENTION

Technical Problem

However, in the related art described above, there are situations mutually incompatible. Specifically, a lightweight and thin terminal device is desired while the camera module has a higher resolution and the size of the camera module is increased. In the technique described in PTL 1, although a mechanical shutter is disposed on the shoulder of an actuator, the disposition of the mechanical shutter has become unnecessary in recent years. This is because a transition from a charge coupling device (CCD) to a complementary metal-oxide semiconductor (CMOS) for a solid state image sensor is in progress, and smear problems that are concern with the CCD have disappeared. Therefore, a technique is desired which further reduces the height of the camera module accommodated in the terminal for a part excluding a mechanical shutter.

The present invention is made in view of the above problems, and an object is to provide a camera module capable of reducing the height of the camera module accommodated in a terminal.

Solution to Problem

In order to solve the above problems, a camera module according to an aspect of the present invention is a camera module including an image sensor that converts optical signals received through a lens unit into electrical signals and a camera window holding mechanism for holding a camera window, in a shoulder portion of the camera module, in which an opening is formed in a center portion of the camera window holding mechanism, and some of lenses on an object side of the lens unit are accommodated in the opening.

Advantageous Effects of Invention

According to an aspect of the present invention, there is an effect that the height of the camera module accommodated in a terminal may be reduced.

Other objects, features, and advantages of the present invention will be fully understood from the description below. The advantages of the present invention will be apparent from the description made below with reference to the accompanying drawings.

DESCRIPTION OF EMBODIMENTS

Figure 1:
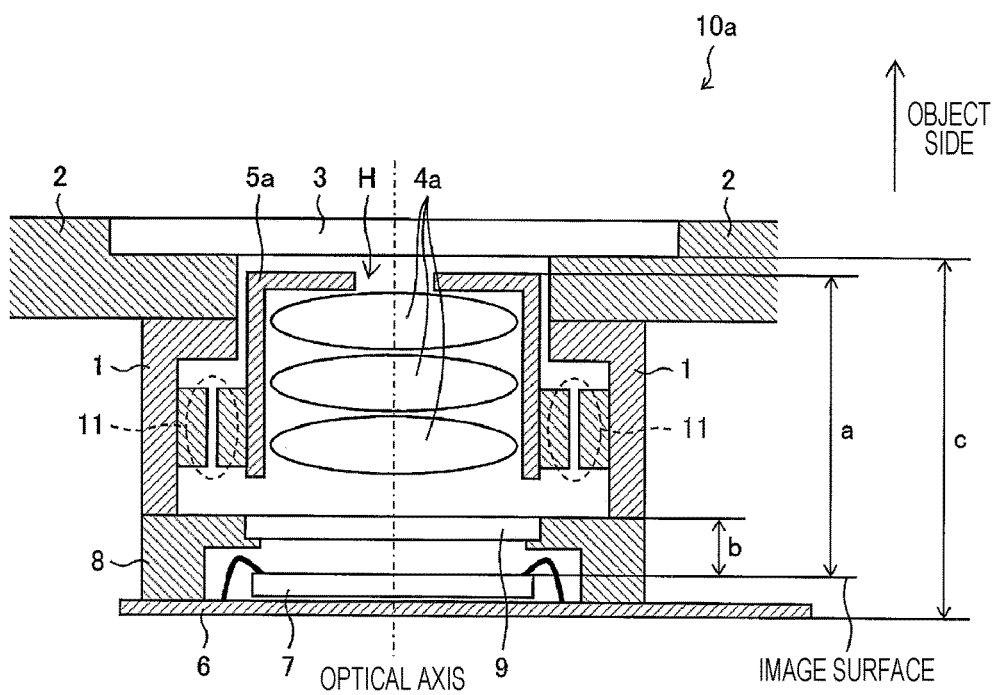
FIG. 1 is a sectional view illustrating a structure of a camera module according to Embodiment 1 of the present invention.

Embodiments of the present invention are described as follows with reference to FIG. 1 to FIG. 6. Below, for convenience of description, components with the same functions as those of the components described in particular embodiments are assigned the same reference numerals, and the description thereof will be omitted.

Embodiment 1

FIG. 1 is a sectional view illustrating a structure of a camera module 10a according to Embodiment 1 of the present invention. The camera module 10a is a camera module including a sensor (image sensor) 7 that converts optical signals received through a lens unit 4a into electrical signals. As illustrated in FIG. 1, the camera module 10a includes an actuator 1, a camera window holding mechanism 2, a terminal camera window (camera window) 3, a lens unit 4a, a lens barrel 5a, a substrate 6, a sensor 7, a cover glass holding mechanism 8, cover glass 9, and a mechanical system 11. Further, in the camera module 10a of the present embodiment, the substrate 6, the sensor 7, the cover glass 9, the lens unit 4a, and the terminal camera window 3 are disposed in this order in the up-and-down direction in the plane of paper.

(Actuator 1 and Mechanical System 11)

The actuator 1 drives the lens unit 4a in the optical axis direction via the mechanical system 11. Further, the mechanical system 11 includes a drive coil and a magnet, and drives the lens unit 4a in the optical axis direction, by the electromagnetic force generated by applying a current to the drive coil in a magnetic field which is formed by the magnet. It is possible to control the driving of the lens unit 4a in the optical axis direction by controlling the current flowing to the drive coil. This enables an auto-focus (AF) function.

The actuator 1 (and the mechanical system 11) described above is a voice coil motor (VCM) type actuator. However, the actuator 1 is not restricted to the VCM type. For example, various types of actuators such as a type using a stepping motor and a type using a piezoelectric element can be applied.

(Camera Window Holding Mechanism 2 and Terminal Camera Window 3)

The camera window holding mechanism 2 has a spacer and a cushioning material, and holds the terminal camera window 3. The terminal camera window 3 is formed of tempered glass, and the terminal camera window 3 can prevent the ingress of water and dust to the interior of the casing of a smartphone (a terminal device) 20 described later. As illustrated in FIG. 1, the camera window holding mechanism 2 of the present embodiment is disposed on the shoulder portion of the camera module 10a, more specifically, on the shoulder of the actuator 1. Thus, while maintaining the installation space of the camera window holding mechanism 2, it is possible to realize the camera module 10a which is compactly housed in the smartphone 20. In addition, as in the present embodiment, in a case of using the actuator 1 (and the mechanical system 11) for realization of the AF function or the like, it is necessary to provide a margin by the amount of feeding of the lens unit 4a between the terminal camera window 3 and the lens unit 4a.

(Lens Unit 4a)

The lens unit 4a is configured with a plurality of lenses, and FIG. 1 illustrates a state in which the lens unit 4a is configured with three lenses. The number of lenses constituting the lens unit 4a is not limited to three. An opening H is formed in a center portion of the camera window holding mechanism 2 of the camera module 10a illustrated in FIG. 1, and some of lenses on an object side of the lens unit 4a are accommodated in the opening H. In contrast, in the camera module 100 of the comparative example illustrated in FIG. 6, some of lenses on the object side of the lens unit 104 are not accommodated in the opening H of the camera window holding mechanism 102. According to the camera module 10a of the present embodiment, as compared to the camera module 100, it is possible to reduce the height of the camera module 10a accommodated in the smartphone 20, by the amount of accommodation of some of lenses on the object side of the lens unit 4a inside the opening H of the camera window holding mechanism 2.

(Lens Barrel 5a)

The lens barrel 5a is a casing in which the plurality of lenses described above are assembled. The lens barrel 5a and the lens unit 4a are driven in the optical axis direction by the actuator 1 via the mechanical system 11.

(Substrate 6 and Sensor 7)

The sensor 7 is an image sensor that converts optical signals received through the lens unit 4a into electrical signals, and is formed of a CMOS in the present embodiment. In addition, in a case of using the mechanical shutter, a CCD instead of the CMOS may be used for the sensor 7. The sensor 7 is fixed on the substrate 6 by wire bonding. Although the substrate 6 of the present embodiment is illustrated as a wire bond type, the same effects can be achieved even in a flip chip or the like.

(Cover Glass Holding Mechanism 8 and Cover Glass 9)

Imaging light transmitted through the lens unit 4a is incident on a cover glass 9 [mainly, infrared (IR) cut glass]. The cover glass 9 has a transmission property which transmits light having a certain wavelength and blocks light having wavelengths (mainly, infrared rays) other than the certain wavelength. The cover glass holding mechanism 8 holds the cover glass 9.

The camera module 10a of the present embodiment is configured to reduce the accommodation height in the smartphone 20, by providing the camera window holding mechanism 2 on the shoulder portion of the actuator 1 as described above, and accommodating some of lenses on the object side of the lens unit 4a in the opening H (projecting some of lenses on the object side of the lens unit 4a to the opening H).

Figure 6:
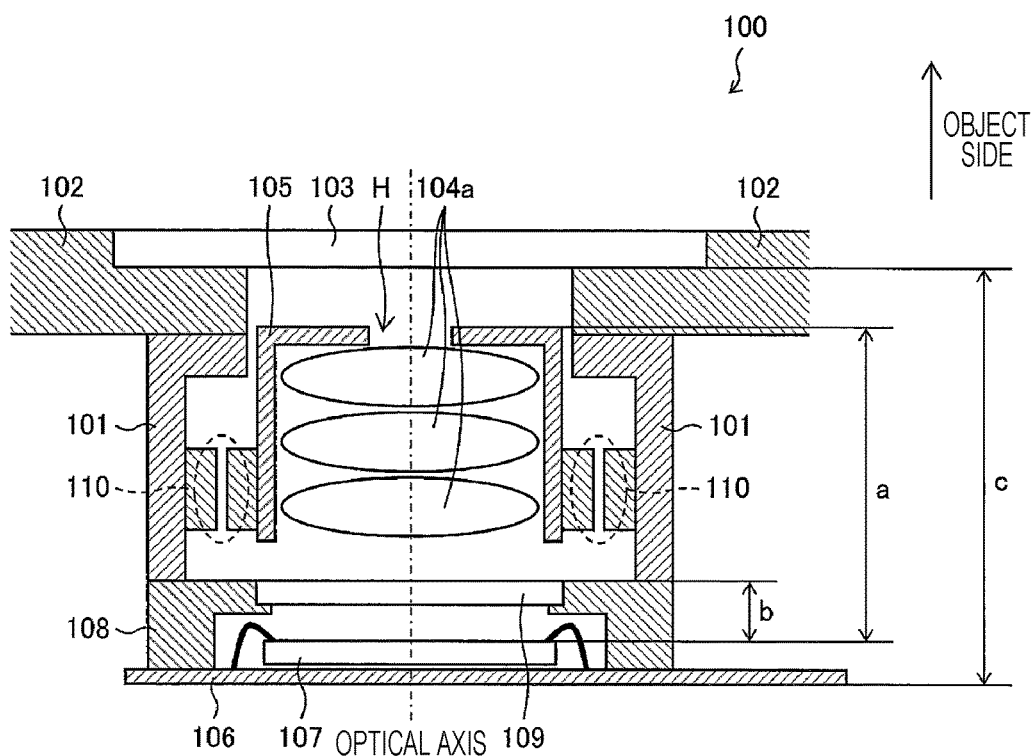
FIG. 6 is a sectional view illustrating a structure of a camera module of a comparative example.

Accordingly, as compared to the camera module 100 of the comparative example illustrated in FIG. 6 in which some of lenses on the object side of the lens unit 104 are not accommodated in the opening H of the camera window holding mechanism 102, it is possible to reduce the height of the camera module 10a accommodated in the smartphone 20. Specifically, it is possible to reduce the value of a distance c while keeping a distance a and a distance b illustrated in FIG. 1 to the same value as compared to the camera module 100 of the comparative example illustrated in FIG. 6. Here, the distance a is a distance from the top (or a top surface) of the lens barrel 5a to an image surface, and typically has a constant value. Further, the distance b is a distance from the top surface of the cover glass 9 to the image surface, and preferably has a value greater than or equal to a certain value. Further, the distance c is a distance from the inside of the terminal camera window 3 to the bottom of the camera module 10a, and corresponds to the size of the space for accommodation of the camera in the smartphone 20.

Embodiment 2

Figure 2:
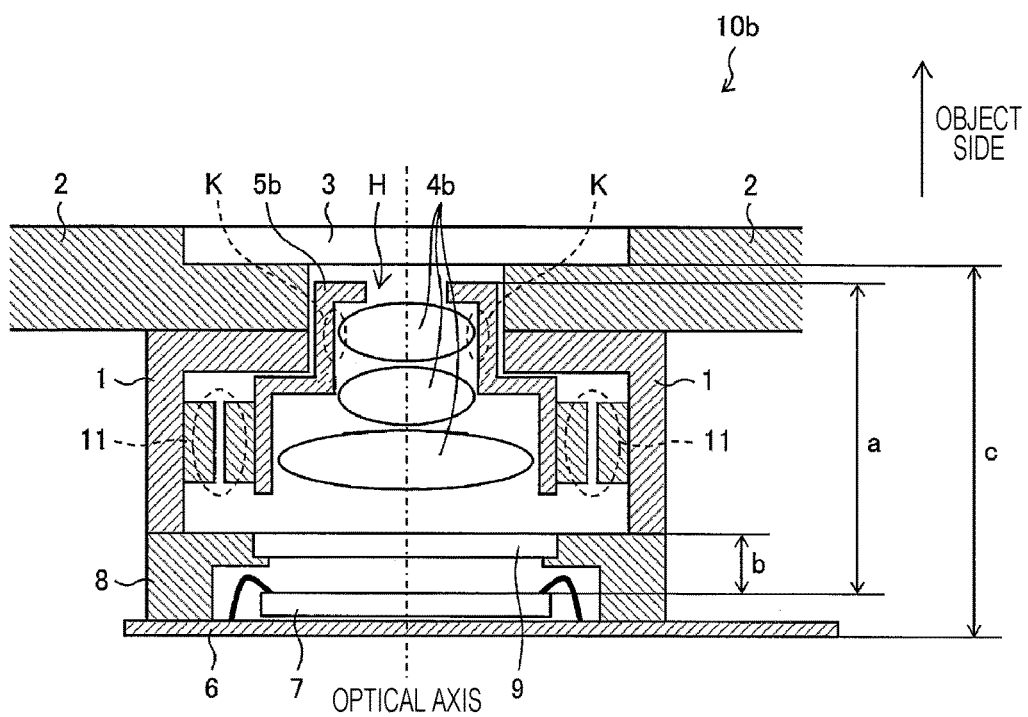
FIG. 2 is a sectional view illustrating a structure of a camera module according to Embodiment 2 of the present invention.

FIG. 2 is a sectional view illustrating a structure of a camera module 10b according to Embodiment 2 of the present invention. The camera module 10b of the present embodiment is different from the camera module 10a described above in that the lenses on the object side of the lens unit 4b have smaller diameters than other lenses, and the wall surface (the receiving portion of the camera window holding mechanism 2) of the opening H of the camera window holding mechanism 2 is close to edge portions K of the lenses on the object side of the lens unit 4b. PTL 2 discloses a configuration for reducing the size, by accommodating an actuator in a portion having a smaller diameter by using a difference between the effective lens diameters. However, in the present embodiment, the camera window holding mechanism 2 fills a vacant space provided as a result of reducing the diameter of the lenses on the object side, and the opening window size (the size of the opening H) is reduced in diameter. According to the structure of the camera module 10b of the present embodiment, since the size of the opening H (the opening window size) is reduced, a ratio of the holding area of the camera window holding mechanism 2 to the terminal camera window 3 is increased, and this enables a simplified appearance, an increase in strength, and a thinner structure due to an increase in strength.

Further, in the present embodiment, the tip diameter of the tip aperture lens barrel 5b is also reduced, in association with a reduction in a diameter of a lens on the object side of the lens unit 4b. For example, according to Example 1 of PTL 3, whereas the effective radii of a first lens L1 and a second lens L2 are 1.44 mm at maximum, the diameter of a fifth lens L5 is maximum and the effective radius thereof is 3.15 mm. When it is assumed that the lens diameter on the aperture side is small and the thicknesses of the edge portion and the lens barrel are constant, if it is considered that the diameter can be reduced by the difference in the effective diameters, in this case, the tip diameter of the lens barrel 4b can be reduced by approximately −3.42 mm.

Embodiment 3

Figure 3:
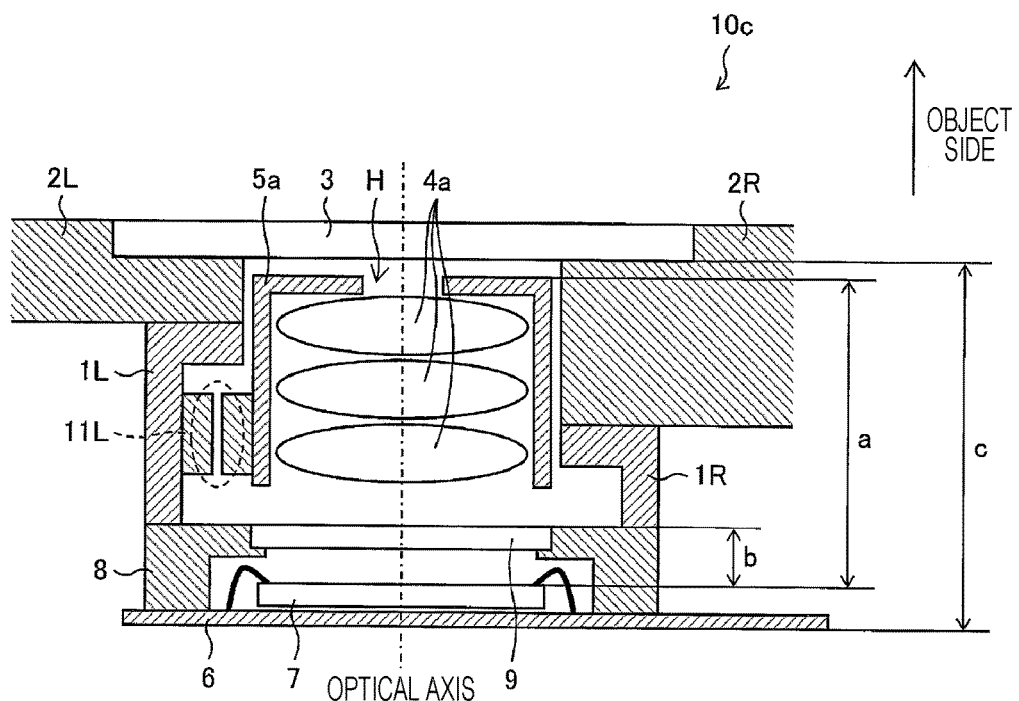
FIG. 3 is a sectional view illustrating a structure of a camera module according to Embodiment 3 of the present invention.

FIG. 3 is a sectional view illustrating a structure of a camera module 10c according to Embodiment 3 of the present invention. The camera module 10c of the present embodiment is different from the camera module 10a described above in that a camera window holding mechanism 2R is disposed, by partially varying the thickness in the optical axis direction of the camera window holding mechanism, for non-rotational symmetrical actuators 1L, 1R (in FIG. 3, a mechanical system 11L is present only on the left side of paper and a mechanical system is not present on the right side). For the convenience, a portion present on the right side in paper, of the camera window holding mechanism illustrated in FIG. 3, is referred to as a camera window holding mechanism 2R, and a portion present on the left side is referred to as a camera window holding mechanism 2L. In this case, the thickness in the optical axis direction of the camera window holding mechanism 2R is thicker than the thickness of the camera window holding mechanism 2L.

As seen from another point of view, the camera module 10c of the present embodiment is different from the camera module 10a described above in that the height in the optical axis direction of the actuator is different on the right side and the left side in paper. For the convenience, a portion present on the right side of paper, of the actuator illustrated in FIG. 3, is referred to as an actuator 1R, and a portion present on the left side is referred to as an actuator 1L. In this case, the height in the optical axis direction of the actuator 1R is lower as compared with the height in the optical axis direction of the actuator 1L.

In other words, in the camera module 10c of the present embodiment, a portion (camera window holding mechanism 2R) in which the thickness in the optical axis direction of the camera window holding mechanism is greater than other portions fills a portion between a place (actuator 1R) in which the height in the optical axis direction of the actuator is lower than other portions and the terminal camera window 3. Thus, it is possible to ensure a large space for accommodating the camera window holding mechanism, and since the thickness in the optical axis direction of the camera window holding mechanism 2R which is accommodated in the space is greater than other portions (the thickness of cushioning material becomes greater), it is possible to improve the impact resistance.

Embodiment 4

Figure 4:
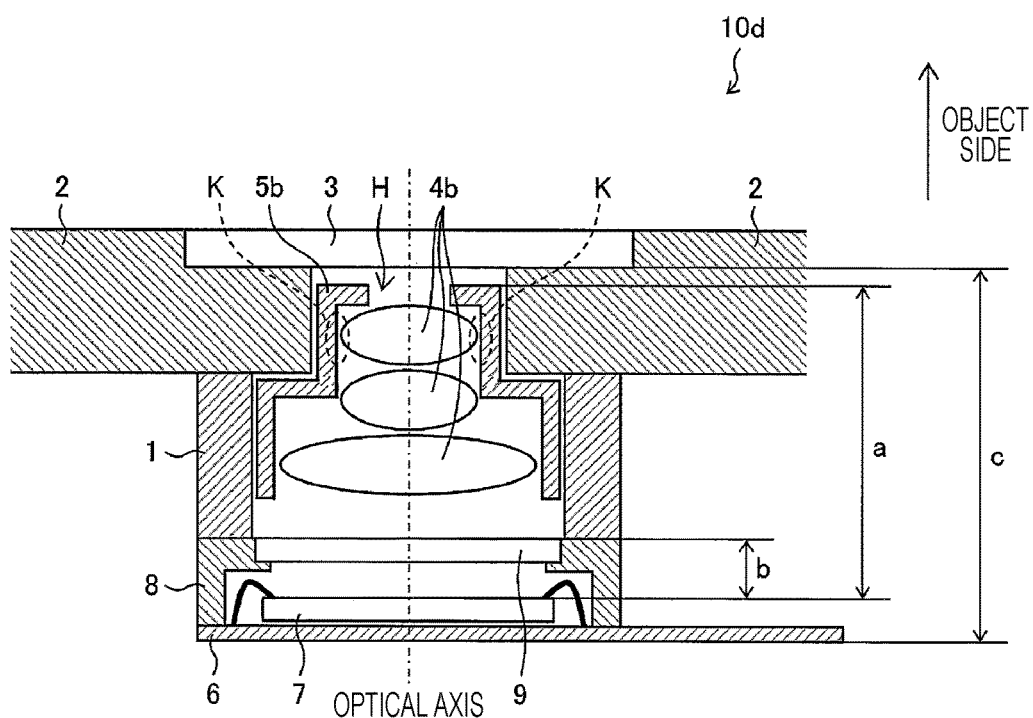
FIG. 4 is a sectional view illustrating a structure of a camera module according to Embodiment 4 of the present invention.

FIG. 4 is a sectional view illustrating a structure of a camera module 10d according to Embodiment 4 of the present invention. The camera module 10d of the present embodiment is different from the camera module 10a described above in that, similarly to Embodiment 2, the lenses on the object side of the lens unit 4b have smaller diameters than other lenses, and the wall surface of the opening H of the camera window holding mechanism 2 is close to an edge portion K of the lens on the object side of the lens unit 4b. Thus, since the size of the opening H is reduced, a ratio of the holding area of the camera window holding mechanism 2 to the terminal camera window 3 is increased, and this enables a simplified appearance, an increase in strength, and a thinner structure due to an increase in strength.

The camera module 10d of the present embodiment is different from the camera module 10a in that the mechanical system described above is not present. Therefore, in the present embodiment, there is no need to consider the movement of the lenses on the object side of the lens unit 4b for AF adjustment, which enables further reduced space accommodation by projecting the lens on the object side of the lens unit 4b to the inside of the opening H up to a install margin limit (by moving the lens close to the inner side of the terminal camera window 3).

In other words, since the AF function is not used in the camera module 10d of the present embodiment, it is possible to move the lens on the object side of the lens unit 4b more close to the inner side of the terminal camera window 3. Thus, as compared to the camera module in which it is not possible to move the lens on the object side of the lens unit close to the camera window due to the AF function, it is possible to reduce the height of the camera module 10d accommodated in the smartphone 20. Further, in the present embodiment, similarly to Embodiment 2, the tip diameter of the tip aperture lens barrel 5b is also reduced in association with a reduction in a diameter of a lens on the object side of the lens unit 4b.

Embodiment 5

Figure 5:
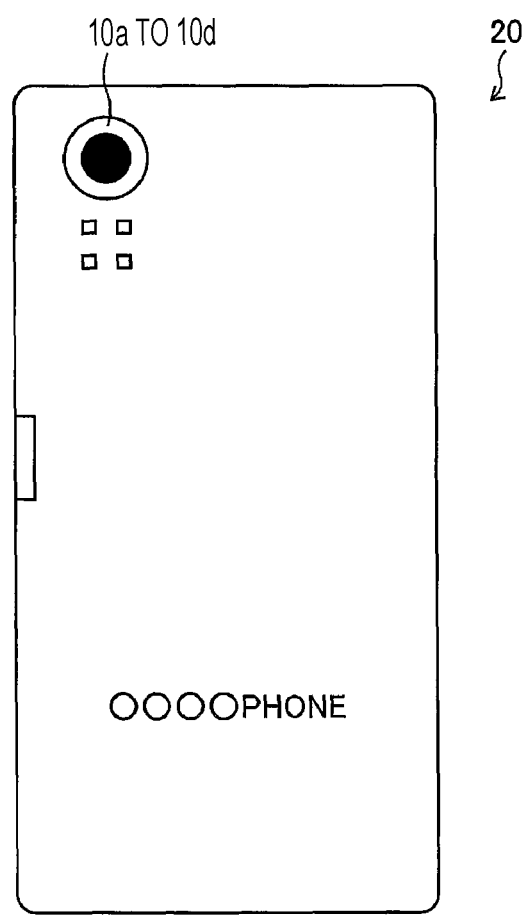
FIG. 5 is an external view illustrating the back surface side of a terminal device (smartphone) of Embodiment 5 of the present invention.

FIG. 5 is an external view illustrating the back surface side of the smartphone 20 according to Embodiment 5 of the present invention. As illustrated in FIG. 5, the smartphone 20 of the present embodiment is configured to include any one of the camera modules 10a to 10d of Embodiments 1 to 4 described above on the back side of the casing. According to the smartphone 20 of the present embodiment, it is possible to reduce the height of any of the camera modules 10a to 10d accommodated in the smartphone 20, and thus the smartphone 20 may be thin.

Conclusion

The camera modules (10a to 10d) according to Aspect 1 of the present invention is a camera module including an image sensor (sensor 7) that converts optical signals received through the lens units (4a, 4b) into electrical signals, and including camera window holding mechanisms (2, 2L, 2R) for holding a camera window (terminal camera window 3) in a shoulder portion of the camera module, in which an opening (H) is formed in a center portion of the camera window holding mechanism, and some of lenses on an object side of the lens unit are accommodated in the opening. According to the above configuration, some of lenses on the object side of the lens unit are accommodated in the opening of the camera window holding mechanism. Accordingly, as compared to the camera module in which some of lenses on the object side of the lens unit are not accommodated in the opening of the camera window holding mechanism, it is possible to reduce the height of the camera module accommodated in the terminal.

The camera module according to Aspect 2 of the present invention, in Aspect 1, further includes actuators (1, 1L) for driving the lens unit in an optical axis direction, and the camera window holding mechanism may be disposed on the shoulders of the actuators. According to the above configuration, since the camera window holding mechanism is disposed on the shoulder of the actuator, while maintaining the installation space for the camera window holding mechanism, it is possible to realize the camera module which is compactly housed in the terminal.

The camera module according to Aspect 3 of the present invention, in Aspect 1 or 2, the lenses on the object side of the lens unit have smaller diameters than other lenses, and a wall surface of the opening of the camera window holding mechanism may be close to an edge portion of the lens on the object side of the lens unit. According to the above configuration, since the size of the opening is reduced, a ratio of the holding area of the camera window holding mechanism to the terminal camera window is increased, and this enables a simplified appearance, an increase in strength, and a thinner structure due to an increase in strength.

The camera module according to Aspect 4 of the present invention, in Aspect 3, the lens on the object side of the lens unit may be close to the camera window. According to the above configuration, since the lenses on the object side of the lens unit are close to the camera window, as compared to the camera module in which the lenses on the object side of the lens unit are not close to the camera window, it is possible to reduce the height of the camera module accommodated in the terminal.

The camera module according to Aspect 5 of the present invention, in Aspect 2, a portion of the camera window holding mechanism in which the thickness in the optical axis direction is greater than other portions may fill a portion between a place in which the height in an optical axis direction of the actuator is lower than other portions and the camera window. According to the above configuration, it is possible to ensure a large space for accommodating the camera window holding mechanism, and since the thickness in the optical axis direction of the camera window holding mechanism which is accommodated in the space is greater than other portions, it is possible to improve the impact resistance.

Further, the terminal device according to Aspect 6 of the present invention may include the camera module of any one of Aspects 1 to 5. According to the above configuration, since it is possible to reduce the height of the camera module accommodated in a terminal, the terminal device may be thin.

Other Implementations of the Present Invention

Further, the present invention can be implemented as follows.

In other words, the camera module according to an aspect of the present invention may be configured such that a terminal camera window holding unit is provided on the shoulder of the module and the lens is protruded. According to the above configuration, with a necessary camera window holding mechanism being provided, it is possible to compactly accommodate a camera module having in general a restriction in the overall optical length in the terminal.

The camera module according to another aspect of the present invention may be configured such that a terminal camera window holding unit is provided on the shoulder of the actuator and the lens is protruded. According to the above configuration, since the camera window holding mechanism is accommodated on the shoulder portion of the actuator, while maintaining the necessary installation space for the camera window holding mechanism, it is possible to realize the camera module which is compactly housed in the terminal.

The camera module according to further another aspect of the present invention may be configured to have a lens configuration in which a tip aperture is set or an aperture is set between the first and second lenses, the lenses on the object side are reduced in diameter, and the receiving portion of the camera window holding mechanism is disposed at the inner side of a module. In addition, this camera module may have both specifications in which the actuator is present and is not present. According to the above configuration, since the size of the window opening is reduced, a holding area ratio is increased, and this enables a simplified appearance, an increase in strength, and a thinner structure due to an increase in strength.

The camera module according to further another aspect of the present invention may be configured such that a holding mechanism is partially disposed for a non-rotationally-symmetrical actuator. According to the above configuration, since a space for the holding member is ensured and the thickness of cushioning material is increased, impact resistance is improved.

Additional Matters

The present invention is not limited to the respective embodiments described above, various modifications are possible within the scope disclosed in claims, and an embodiment obtained by suitably combining the technical means respectively disclosed in different embodiments is contained in the technical scope of the present invention. In addition, it is possible to form new technological features by combining the technical means which are respectively disclosed in the respective embodiments.

INDUSTRIAL APPLICABILITY

The present invention can be suitably used in a terminal device such as a smartphone, a mobile phone, and a tablet personal computer (PC), and a camera module provided in the terminal device.

REFERENCE SIGNS LIST 1, 1L ACTUATOR
2, 2L, 2R CAMERA WINDOW HOLDING MECHANISM
3 TERMINAL CAMERA WINDOW (CAMERA WINDOW)
4a, 4b LENS UNIT
7 SENSOR (IMAGE SENSOR)
10a TO 10d CAMERA MODULE
20 SMARTPHONE (TERMINAL DEVICE)
H OPENING
K EDGE PORTION

The invention claimed is:

1. A camera module comprising:
   an image sensor that converts optical signals received through a lens unit into electrical signals; and
   a camera window holding mechanism for holding a camera window formed of glass, in a shoulder portion of the camera module; and
   a lens barrel, the lens barrel being a casing in which a plurality of lenses constituting the lens unit are assembled, the lens barrel having a tip with a reduced diameter, wherein
   an opening is formed in the camera window holding mechanism at a position that is closer to the image sensor than is the camera window, the opening having a center aligned with a center of the camera window, and
   at least one of the plurality of lenses which is on an object side of the lens unit is at least partially accommodated in the opening.

2. The camera module according to claim 1, further comprising:
   an actuator for driving the lens unit in an optical axis direction,
   wherein the camera window holding mechanism is disposed on a shoulder of the actuator.

3. The camera module according to claim 1, wherein
   the lenses on the object side of the lens unit have smaller diameters than other lenses, and
   a wall surface of the opening of the camera window holding mechanism is close to an edge portion of the lens on the object side of the lens unit.

4. The camera module according to claim 3,
   wherein the lenses on the object side of the lens unit are close to the camera window.

5. The camera module according to claim 2,
   wherein a portion of the camera window holding mechanism in which the thickness in the optical axis direction is greater than other portions fills a portion between a place in which the height in an optical axis direction of the actuator is lower than other portions and the camera window.

6. A terminal device comprising the camera module according to claim 1.

7. The camera module according to claim 2, wherein:
   the actuator includes a projecting portion that projects toward an optical axis of the lens unit and covers a portion of the lens barrel.

* * * * *